United States Patent
Goldmann

(10) Patent No.: US 9,156,191 B2
(45) Date of Patent: Oct. 13, 2015

(54) METHOD FOR PROCESSING A TEXTILE FRACTION, WHICH WAS PRODUCED IN THE PROCESSING OF DISCARDED TIRES, AND INSTALLATION FOR IMPLEMENTING THE METHOD

(75) Inventor: Daniel Goldmann, Goslar (DE)

(73) Assignee: VOLKSWAGEN AG, Wolfsburg (DE)

(*) Notice: Subject to any disclaimer, the term of this patent is extended or adjusted under 35 U.S.C. 154(b) by 1023 days.

(21) Appl. No.: 13/141,869

(22) PCT Filed: Nov. 30, 2009

(86) PCT No.: PCT/EP2009/008506
§ 371 (c)(1),
(2), (4) Date: Sep. 7, 2011

(87) PCT Pub. No.: WO2010/072306
PCT Pub. Date: Jul. 1, 2010

(65) Prior Publication Data
US 2011/0309173 A1    Dec. 22, 2011

(30) Foreign Application Priority Data

Dec. 23, 2008  (DE) .................... 10 2008 063 047

(51) Int. Cl.
*B03C 1/30* (2006.01)
*B29B 17/02* (2006.01)
(Continued)

(52) U.S. Cl.
CPC .............. *B29B 17/02* (2013.01); *B03C 1/288* (2013.01); *B03C 1/30* (2013.01); *B07B 4/02* (2013.01);
(Continued)

(58) Field of Classification Search
CPC .......... B02C 23/08; B02C 23/14; B03C 1/16; B03C 1/30; B07B 7/00; B07B 7/08; C22B 7/005
USPC ................ 209/12.1, 39, 214, 216, 643, 930; 241/68, 23.14, 24.17
See application file for complete search history.

(56) References Cited

U.S. PATENT DOCUMENTS 3,923,256 A * 12/1975 Dorner .......................... 241/76
4,036,441 A * 7/1977 Basten et al. .................. 241/20
(Continued)

FOREIGN PATENT DOCUMENTS

| DE | 30 39 870 | 10/1981 |
|---|---|---|
| DE | 196 29 473 | 1/1998 |
| DE | 197 55 629 | 6/1999 |
| DE | 100 53 491 | 5/2002 |
| DE | 103 57 968 | 2/2005 |
| EP | 1 020 224 | 7/2000 |
| WO | WO 2004/089610 | 10/2004 |

OTHER PUBLICATIONS

Prof. Dr. Ingo Marini, "Stoffliche Verwertung der Faserfraktion aus dem Altreifenrecycling" Internet URL : http://www.tuwien.ac.at/fileadmin/t/tuwien/downloads/Publishing_Texte/Projektbeschreibung_Marini-neu.pdf, p. 1-24, Nov. 1, 2007.

*Primary Examiner* — Joseph C Rodriguez
(74) *Attorney, Agent, or Firm* — Kenyon & Kenyon LLP

(57) ABSTRACT

A method for processing a textile fraction, which was produced in the processing of discarded tires, includes:
loosening the textile fraction,
density separation of the loosened textile fraction by the force of gravity and air flow into a heavy material fraction and a light material fraction,
separation of metallic components from the light material fraction contained in the air flow, and
separation of the metal-reduced light material fraction from the air flow.
The foregoing combination allows for such an effective separation of a major part of the non-textile components (rubber and in particular steel wires) from the textile fraction, and thus allows for the production of a "refined" textile fraction, that it is not possible to dispose of the latter or that the latter can only be recycled as energy, but rather that it may be fed into a material recycling process.

31 Claims, 5 Drawing Sheets

(51) Int. Cl.
*B03C 1/28* (2006.01)
*B07B 4/02* (2006.01)
*C22B 7/00* (2006.01)
*B29B 17/04* (2006.01)
*B29K 105/06* (2006.01)
*B29K 705/12* (2006.01)
*B29L 30/00* (2006.01)

(52) U.S. Cl.
CPC ......... *C22B 7/005* (2013.01); *B29B 2017/0231* (2013.01); *B29B 2017/0272* (2013.01); *B29B 2017/0492* (2013.01); *B29K 2105/06* (2013.01); *B29K 2313/00* (2013.01); *B29K 2705/12* (2013.01); *B29L 2030/00* (2013.01); *Y02W 30/526* (2015.05); *Y02W 30/54* (2015.05); *Y02W 30/622* (2015.05); *Y02W 30/625* (2015.05); *Y02W 30/68* (2015.05)

(56) References Cited

U.S. PATENT DOCUMENTS

| | | | | |
|---|---|---|---|---|
| 4,165,278 | A * | 8/1979 | Jaffey | 209/45 |
| 4,332,700 | A | 6/1982 | Munih | |
| 4,342,647 | A | 8/1982 | McMillan et al. | |
| 5,301,881 | A * | 4/1994 | Hayashi et al. | 241/65 |
| 5,411,216 | A * | 5/1995 | O'Keefe | 241/24.27 |
| 5,443,157 | A * | 8/1995 | Baker et al. | 209/12.1 |
| 5,588,600 | A * | 12/1996 | Perfido et al. | 241/23 |
| 6,264,037 | B1 | 7/2001 | Schmidt | |
| 6,578,783 | B2 * | 6/2003 | Simon et al. | 241/24.14 |
| 7,389,880 | B2 * | 6/2008 | Goldmann et al. | 209/12.1 |
| 7,823,812 | B2 * | 11/2010 | Fazzini | 241/24.14 |
| 8,393,558 | B2 * | 3/2013 | Gitschel | 241/19 |
| 2004/0094641 | A1 * | 5/2004 | Chen | 241/19 |
| 2007/0158242 | A1 | 7/2007 | Goldmann et al. | |

* cited by examiner

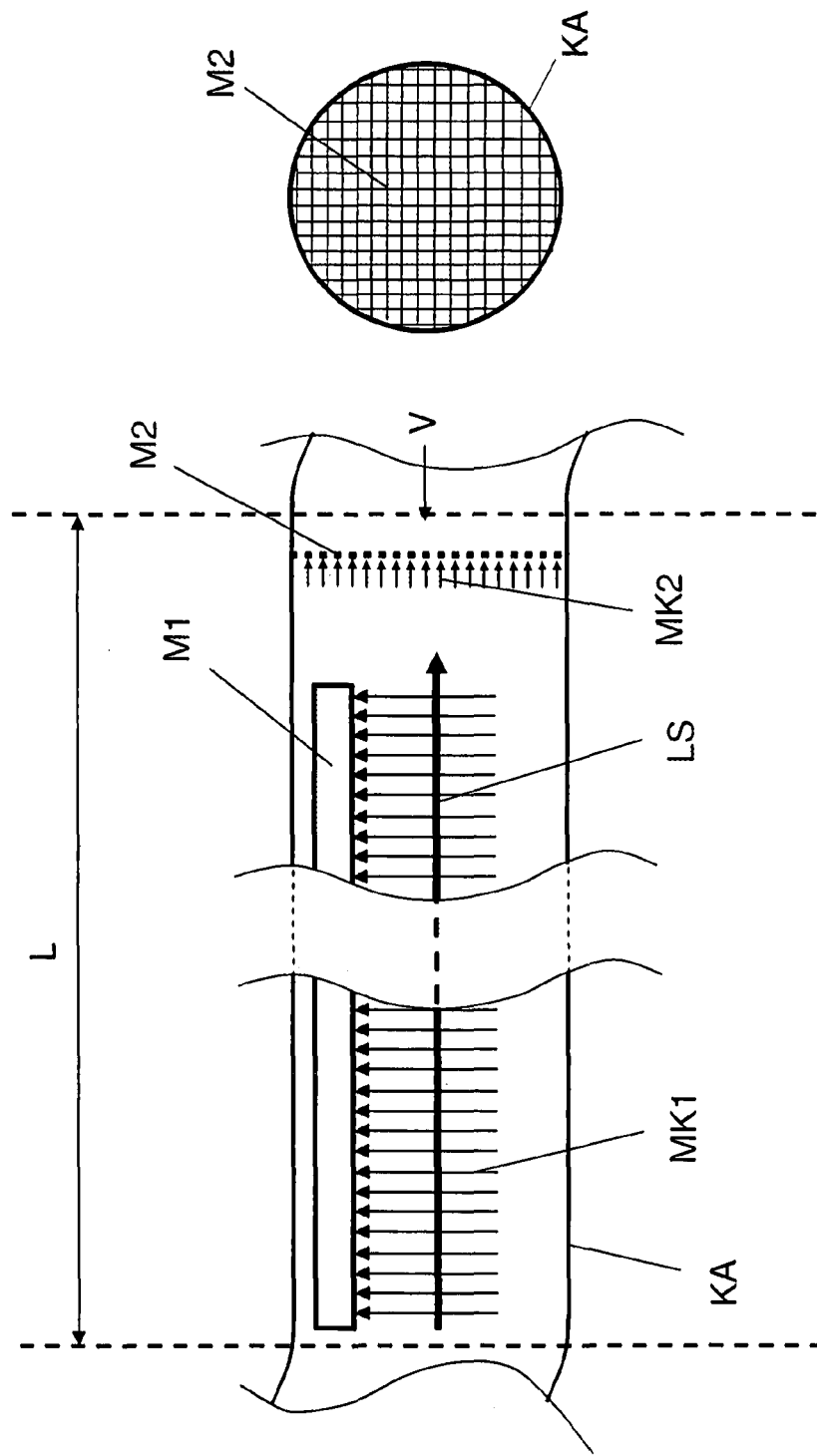

METHOD FOR PROCESSING A TEXTILE FRACTION, WHICH WAS PRODUCED IN THE PROCESSING OF DISCARDED TIRES, AND INSTALLATION FOR IMPLEMENTING THE METHOD

FIELD OF THE INVENTION

The present invention relates to a method for processing a textile fraction, which was produced in the processing of discarded tires, and to an installation for implementing the method.

The present invention further relates to a use of the textile fraction processed in accordance with the present invention as an additive in the treatment of sludge.

BACKGROUND INFORMATION

Discarded tires represent a considerable material flow of a relatively homogeneous type of scrap. Approximately 511,000 t of tires accumulate annually in Germany as discarded tires from the replacement business in the area of repair shop waste disposal and in replacement part retail, approximately 9,000 t of discarded tires are imported, and approximately 65,000 t of discarded tires come from the recycling of discarded vehicles. Thus annually around 585,000 t of tires await further use, recycling or removal in Germany.

Today, a major part of the discarded tires is recycled as energy. Thus, for years, the cement industry has already been using discarded tires as a fuel value-rich secondary raw material for its kilns. Approximately 72,000 t of tires are thus recycled as energy. The second largest utilization of discarded tires is the further use e.g. for retreading, export, use in agriculture or in port facilities. Thus around 120,000 t are kept in the circulation of materials.

Increasingly, however, discarded tires are also processed in order to be fed into an extensive material recycling process.

As the first steps in the processing of discarded tires for the purpose of producing rubber granulate or rubber meal, the main components are broken down by shredding into the fractions of rubber, steel wire and textile crude lint (tire crude lint or textile fraction). These three fractions may then be roughly separated by sorting. There already exist sufficiently developed processes for processing the rubber granulate into marketable high-grade qualities. The textile and steel fractions, by contrast, are so far not processed in an optimized manner and consequently cannot be recycled in an optimized manner. According to the current state of the processing methods, the steel wire fraction still has rubber adhering to it, which has a negative technical and hence also economic effect on metallurgical recycling. Involving the additional payment of waste disposal fees, the textile fraction is hitherto fed into a thermal removal process or a process of recycling as energy. Currently there exist no methods for processing specifically the textile fraction.

In addition there are certain legal prescriptions, which obligate the manufacturers of vehicle tires or of motor vehicles to ensure the environmentally safe recycling or removal of their products. For handling discarded tires from repair shop waste disposal, there are additionally the obligations that automobile manufacturers in this sector have assumed in connection with the legislation regarding the regulation on packaging. The handling of discarded tires from the recycling of discarded vehicles is furthermore covered by the regulation on discarded vehicles, which stipulates that the manufacturers of vehicles must take back discarded vehicles and their parts and feed them into a recycling process. Beginning in 2015, at least 95 percent by weight of a discarded vehicle must be fed into a reuse and recycling process and of this in turn around 85 percent by weight must be fed into a reuse and material recycling process. In discarded tires, the portion of rubber (rubber, fillers, other) may be assessed at approximately 60%, and the portion of reinforcement materials at approximately 40% (17% steel wire, 23% textile).

German Published Patent Application No. 103 57 968 describes a recycling installation and a method for processing (cold shredding) rubber products and steel-rubber composites such as discarded tires of motor vehicles for example. The processing material is first pre-shredded, is embrittled in a downstream cooling zone, is shredded further in an intermediate shredder, and the shredded and portioned processing material is then ground up and torn up using a post-shredder. The steel and the rubber are exposed and selected using a vibrating table having a connected magnetic separator. The textile reinforcement layers exposed following the shredding processes are to be taken out of the shredded processing material using a separating device in the form of an air sifting device, the separating device preferably being arranged in the form of a blower. The separated textile reinforcement layers are subsequently fed into a packaging process in a textile conveyor device.

German Published Patent Application No. 30 39 870 describes a method for separating rubber and metal in discarded tires, which is supposed to separate, in an economically feasible manner, the metal and the rubber so completely that they are reusable. For this purpose, the discarded tire is first shredded and the metal in the shredded tire is heated in an electromagnetic high-frequency field, whereby the boundary layer of the rubber resting against the metal is thermally disintegrated and the metal can then be separated from the rubber.

SUMMARY

Example embodiments of the present invention provide a method for processing a textile fraction, which was produced in the processing of discarded tires, which allows for an effective separation of at least a major part of the non-textile components (rubber and in particular steel wire).

Example embodiments of the present invention provide for the method for processing a textile fraction, which was produced in the processing of discarded tires, to have the following method steps:

loosening the textile fraction,
density separation of the loosened fraction by the force of gravity and air flow into a heavy material fraction and a light material fraction,
separation of metallic components from the light material fraction contained in the air flow, and
separation of the metal-reduced light material fraction from the air flow.

The combination of these method steps allows for such an effective separation of a major part of the non-textile components (rubber and in particular steel wires) from the textile fraction, and thus allows for the production of a "refined" textile fraction, that it is not necessary to dispose of the latter, but rather it may be fed into a material recycling process. The prior loosening of the textile fraction is a basic prerequisite for being able to perform the subsequent method step of the density separation in an efficient manner. The loosened textile fraction may be separated exceptionally well by an air flow into a heavy material fraction and a light material fraction, and a separation of metallic components from the light material fraction may be performed effectively if the light material fraction is contained in an air flow. By separating the metal-reduced light material fraction from the air flow, one finally obtains a refined textile fraction, which is excellently suited for further use.

A "textile fraction", which is supplied to the method for processing, should be understood as a lint-like fraction (tire raw lint) derived from prior tire processing, which is made up predominantly of textile fibers, and furthermore of rubber and steel wires. The individual components are in part highly clumped, tangled or hooked into one another and may be separated from one another in part only with great difficulty once they have been separated in receiving containers at the end of the hitherto customary process. Even when feeding the raw lint directly into the refinement process without a prior separation and intermediate storage, one must assume an insufficient loosening for the subsequent refinement, since the preparatory tire recycling process must satisfy different requirements.

The loosening may occur via an impact treatment. A great loosening of the processing material may be achieved in the impact treatment, which at least allows for a partial separation according to density.

Since following the impact treatment, however, the loosening reverses again relatively quickly, it is very advantageous if the light material fraction is suctioned off in the density separation in the gravity field, that is, if quasi an air flow acting on the light material fraction in a "drawing" manner is established. A "pushing" air flow would rather tend to press the loosened light material fraction together again and would thus act counterproductively. It is very expedient in this connection if the suction is applied approximately perpendicularly with respect to the field of gravity.

It is very advantageous if the suction speed of the air flow is controllable. Expediently, the suction speed of the air flow may be set to a value between approximately 10 m/s and 30 m/s, preferably to approximately 20 m/s. These values, however, may for all intents and purposes turn out differently in a large-scale installation.

Example embodiments of the present invention provide for the separation of the metallic components from the light material fraction contained in the air flow to occur by magnetic separation. This measure is able to achieve good separation results, since the metallic components may be ferromagnetic without exception.

Advantageously, the magnetic force should act substantially transversely with respect to the air flow.

Furthermore, example embodiments of the present invention provide for the magnetic force to act at least across a major part of the length of the air flow or even substantially across the entire length of the air flow. By these measures it is possible to separate efficiently medium-sized wires that are swept along.

To separate particularly long wires, it is very expedient if another magnetic separation occurs of such metallic components from the light material fraction contained in the air flow, the magnetic force acting substantially in parallel to the air flow. For this purpose, it is to be advantageously provided that the magnetic force acts substantially across the entire cross section of the air flow.

There may be a further provision to perform an additional shredding (post-shredding) of the metal-reduced light material fraction following the separation of the metal-reduced light material fraction from the air flow. This may result for example in an improvement in the mixing behavior of the refined textile fraction (tire lint) in sewage sludge if the tire lint should be used as a dewatering device for sewage sludge.

To improve the quality further, it is extremely advantageous to perform the method in two stages, that is, to subject the processed textile fraction to another treatment of the method steps hereof. In this instance, a particularly high separation of rubber and wire components from the textile fraction is ascertained without an excessive lowering of the output of the lint portion into the refined lint fraction. Here it must be noted that the second treatment stage neither has to follow the first treatment stage directly in time, nor has to occur in the same location. The processed textile fraction or the tire lint, however, is highly loosened immediately following the extraction from the air flow and thus occupies a very large volume. After some time, however, the tire lint compacts again. A recompacting produced by storage and/or transport, however, may significantly impede mixing it into sewage sludge for example. For this reason, further processing of the processed textile fraction should occur as immediately as possible following the processing so as to avoid having to loosen the processed textile fraction once again. In such cases it is thus expedient to arrange the performance of the second processing stage temporally and spatially directly before the further processing (for example before the input into the mashing container in a sewage sludge conditioning process). Following the first processing stage, it is possibly expedient to compact the processed textile fraction in a manner optimized for transport and to transport it to the "customer", who will process the processed textile fraction further in the second method stage on site only immediately prior to further utilization.

According to example embodiments of the present invention, the installation has devices that make the following method steps possible:
  loosening the textile fraction,
  density separation of the loosened fraction by the force of gravity and air flow into a heavy material fraction and a light material fraction,
  separation of metallic components from the light material fraction contained in the air flow, and
  separation of the metal-reduced light material fraction from the air flow.

For this purpose it is very expedient to provide at least one impact mill as a loosening device. Impact mills are technically mature aggregates, and a high degree of loosening of the material is achievable in the impact treatment. A particularly high degree of separation for wires may be achieved if the impact mill has multiple impact bars rotating vis-à-vis stationary impact plates, at least one first impact plate and one second impact plate being provided and the distance of the impact bars from the impact plates decreasing in the direction of rotation of the impact mill (or impact bars).

At least one channel-like section should be provided as a density separation device, which should be arranged approximately horizontally (and thus approximately perpendicularly with respect to the force of gravity) and should be preferably provided in a tubular manner. The channel-like section should be expediently connected to the vertical chute in the discharge of the impact mill above the heavy material discharge. The light material is thus more readily able to enter the channel-like section and separate from the heavy material. These measure moreover contribute toward providing the installation as a largely closed system, which facilitates controlling the air flow or the suction speed in the channel-like section.

To separate metallic components from the light material fraction contained in the air flow, it is very advantageous to provide at least one magnet, in particular a permanent magnet. The magnet may be expediently situated in the channel-like section such that its magnetic force acts substantially transversely to the air flow. Moreover, additional advantages are gained if the magnet extends substantially across a major part of the length of the channel-like section. Expediently, the channel-like section has at least one insertion option for the at least one magnet so that the latter may be easily installed on the one hand and be easily freed (continuously or discontinuously) of adhering "caught" wires.

For separating particularly long wires it may be very advantageous to provide, in the channel-like section, a device for a further magnetic separation of metallic components from the light material fraction contained in the air flow, their magnetic force acting substantially in parallel to the air flow. A magnetic grate may be provided for this purpose. Expediently, the magnetic grate should extend substantially across the entire cross section of the channel-like section.

Following the separation of the metal-reduced light material fraction from the air flow, it may be expedient to provide device for a further shredding (post-shredding) of the metal-reduced light material fraction. This may promote for example the mixing behavior of the light material fraction or of the processed textile fraction in sewage sludge.

A cyclone may be provided for separating the metal-reduced light material fraction from the air flow.

Example embodiments of the present invention provide for using the textile fraction processed in accordance with the method described herein as an additive for the treatment of sludge. The processed textile fraction (tire lint) has an excellent use for dewatering sludge, in particular sewage sludge.

Additional advantages and features of example embodiments of the present invention are explained in more detail with the aid of the attached figures.

BRIEF DESCRIPTION OF THE DRAWINGS

FIG. 4 is a view of the installation according to detail view IV from FIG. 3.

FIG. 5 is a view of the installation according to view V from FIG. 4.

DETAILED DESCRIPTION

Figure 1:
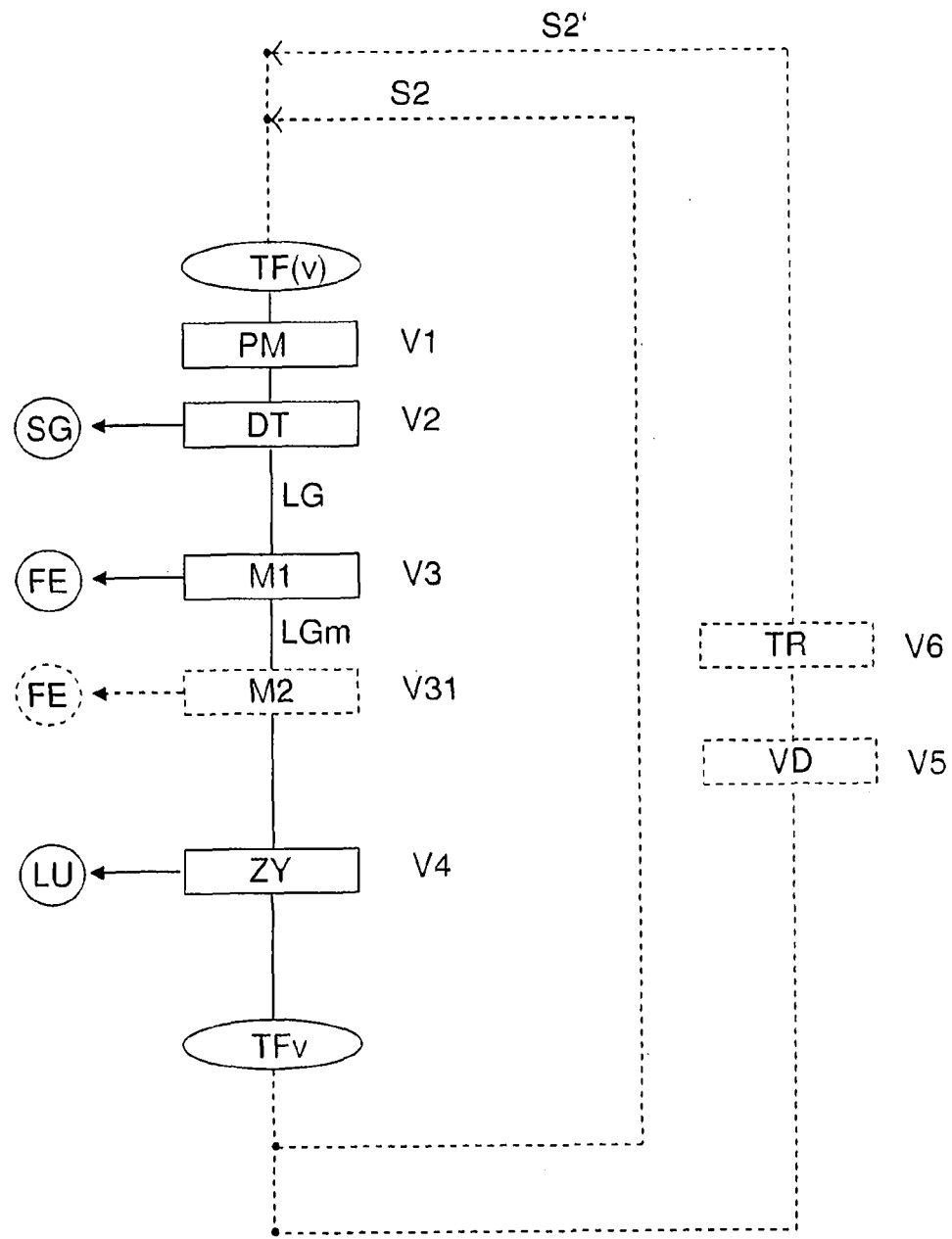
FIG. 1 is a schematic flow chart of the successive process steps for processing the textile fraction, the possibility of a two-stage process being indicated as well by dashed lines.

First, reference is made to FIG. 1. A textile fraction (tire raw lint) TF is subjected to a loosening process V1 in an impact mill PM. The textile fraction TF is predominantly composed of textile fibers (approx. 70% by weight) and furthermore of a rubber component (approx. 29% by weight) and a smaller component of magnetic steel wires (approx. 0.05% by weight), the textile fibers taking up a major part of the volume of the textile fraction. The individual components are in part highly clumped, tangled or hooked into one another and may be separated from one another in part only with great difficulty. The steel wires are represented predominantly in lengths between approx. 1 mm and approx. 40 mm and diameters of 0.2 to 0.45 mm. Particularly the long wires in textile fraction TF are in part extremely hooked into the textile fibers. The impact treatment V1 is able to achieve a high degree of loosening of textile fraction TF, which subsequently first allows for or greatly promotes at least a partial separation according to density. Impact treatment V1 is followed by a density separation V2 in the field of gravity using an air flow that is preferably approximately perpendicular to the field of gravity, a major part of the wires together with the rubber being already separated as heavy material fraction SG. Some wires cannot be separated, however, and enter into a light material fraction LG together with the textile fibers. Light material fraction LG is subsequently subjected to a magnetic separation V3 of ferromagnetic components FE (substantially wires) using a magnetic separator M1 and is converted into a metal-reduced light material fraction LGm. Magnetic separation V3 may be (optionally) followed by another magnetic separation V31 using a magnetic separator M2. As the final method step, a separation V4 is performed of the metal-reduced light material fraction LGm produced in the preceding method steps V1 through V3 (or V31) from air flow LU using a cyclone ZY, the separated material at the same time representing a refined textile fraction TFv.

The method described above represents a first basic stage of the refinement of textile fraction TF. Optionally, however, there may be a provision to feed the already refined textile fraction TFv once more to method steps V1 through V4 in a second stage S2 (represented by dashed lines). This allows for a further reduction of the wire content in textile fraction TFv and thus for another increase in quality. It should be pointed out that it is not necessary for the first and the (optional) second method stage S2 to be in temporal and spatial proximity to each other or to coincide. A second method stage S2' may also be performed at an entirely different location. The textile fibers, which are highly loosened by the first method stage, take up a very large volume and tend to compact again after some time, however. For this reason, the second method stage S2 or S2' should occur only immediately prior to a further processing (for example, feeding into a mashing container in a sewage sludge conditioning process). Should a transport V6 be required in the second method stage S2', it is recommended to subject the processed textile fraction TFv first to a transport-optimized compacting process V5 using a suitable compacting device VD, before bringing it to the destination point of the customer using a suitable transportation device TR.

Figure 2:
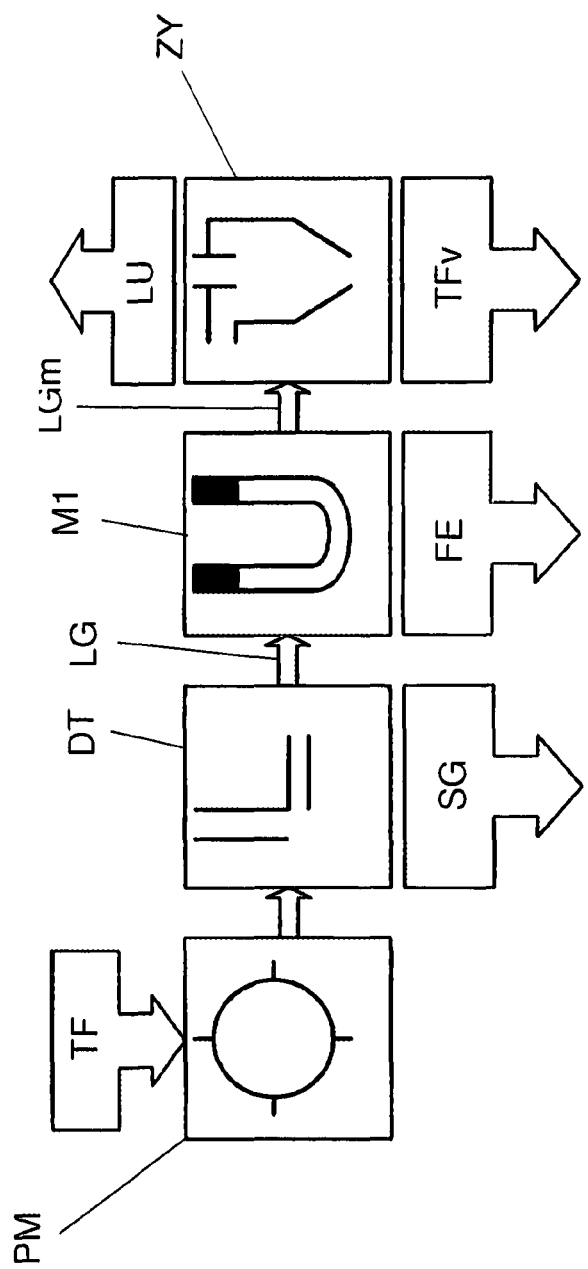
FIG. 2 is a method flow chart of an installation in terms of the underlying principles.

FIG. 2 shows a method flow chart in terms of the underlying principles, which indicates the material flows. First, textile fraction TF is fed into impact mill PM and subsequently to density separation device DT, the heavy material fraction SG being already separated in density separation device DT. The remaining light material fraction LG is subjected to a separation of ferromagnetic components FE using magnetic separator M1, and the thus metal-reduced light material fraction LGm is separated in cyclone ZY by an air flow LU as a refined textile fraction TFv.

Figure 3:
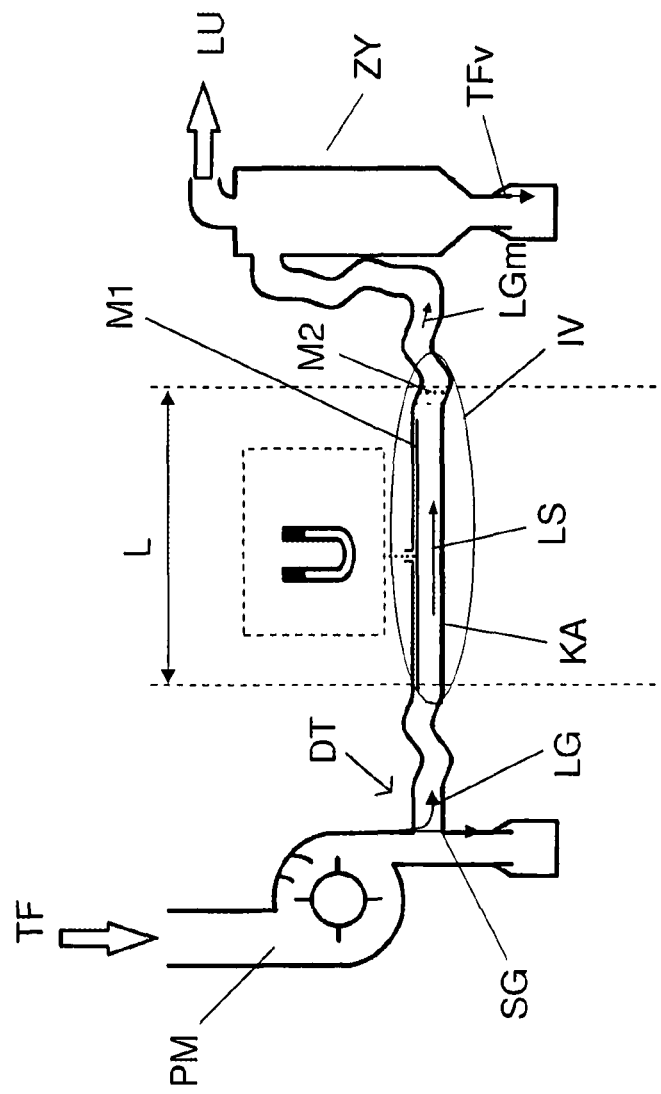
FIG. 3 illustrates the material and air flow routing in an installation.

FIG. 3 shows a concrete air and material routing in an installation. The installation is arranged substantially as a closed system and has as a first aggregate the impact mill PM, in which textile fraction TF (tire raw lint) is introduced from above. In the immediate area of the discharge of impact mill PM, that is, at its vertical chute above the heavy material discharge, there is the density separation device DT, the heavy material fraction SG falling downward in the density separation, and the light material fraction LG being suctioned into an approximately horizontally oriented channel-like section KA. This suction is produced by a blower (not shown), which is connected downstream from cyclone ZY and produces an air flow LU. Cyclone ZY is connected in substantially airtight manner to channel-like section KA and the rest of the installation. The suction may be controlled via the adjustment of the suction on the cyclone with the aid of an adjustment device (not shown in detail), for example a flap valve. In the installation, an air flow in the range of 10 m/s to 30 m/s, in particular 20 m/s, may be provided for this purpose. As a result of the suctioning of light material fraction LG, a "drawing" air flow LS acts on light material fraction LG, and there is no danger that the processing material or the light material fraction LG, which was loosened well as a result of impact treatment V1, is compressed again in channel-like section KA, as would be the case in a "pushing" air flow. The channel-like section KA has a length L. FIG. 3 shows that first magnetic separator M1 is situated in channel-like section KA. Magnetic separator M1 is a permanent magnet (which is merely indicated in the figure by a u-shaped magnet symbol), which is arranged in an elongated manner and extends in its length approximately across the entire length L of channel-like section KA. Channel-like section KA has an insertion option for magnet M1, which is not shown in detail. Magnet M1 may be introduced into channel KA for example either via a flap (for a discontinuous discharge or removal of adhering "caught" wires in the case of small wire quantities) or via connected movable magnets (drum or band magnets) for a continuously timed discharge (in the case of higher wire contents). Approximately at the end of channel-like section KA, a second magnetic separator M2 may be situated, which is likewise a permanent magnet. Since at this point fundamentally only small quantities of residual wires are found, a discontinuous discharge and corresponding devices (not shown in detail) are to be provided for this purpose. Following the metal separation by magnetic separators M1 and M2, metal-reduced light material fraction LGm is transported via a channel to cyclone ZY, where it is separated from air flow LU as a refined textile fraction TFv.

FIG. 4, which shows a detail from FIG. 3, illustrates that first magnetic separator M1 is situated approximately in parallel to air flow LS with respect to its longitudinal extension and has a magnetic force MK1, which acts substantially transversely to air flow LS. Light material fraction LG thus flows past permanent magnet M1 and an efficient separation of wires swept along in light material fraction LG may thus be achieved. The second magnetic separator M2 situated behind first magnetic separator M1 has a magnetic force MK2, which acts approximately in parallel to air flow LS. FIG. 5 shows that second magnetic separator M2 is arranged in the form of a grate and extends across the entire circular cross section of channel-like section KA. Magnetic force MK2 consequently also acts across the entire cross section of air flow LS.

Figure 6:
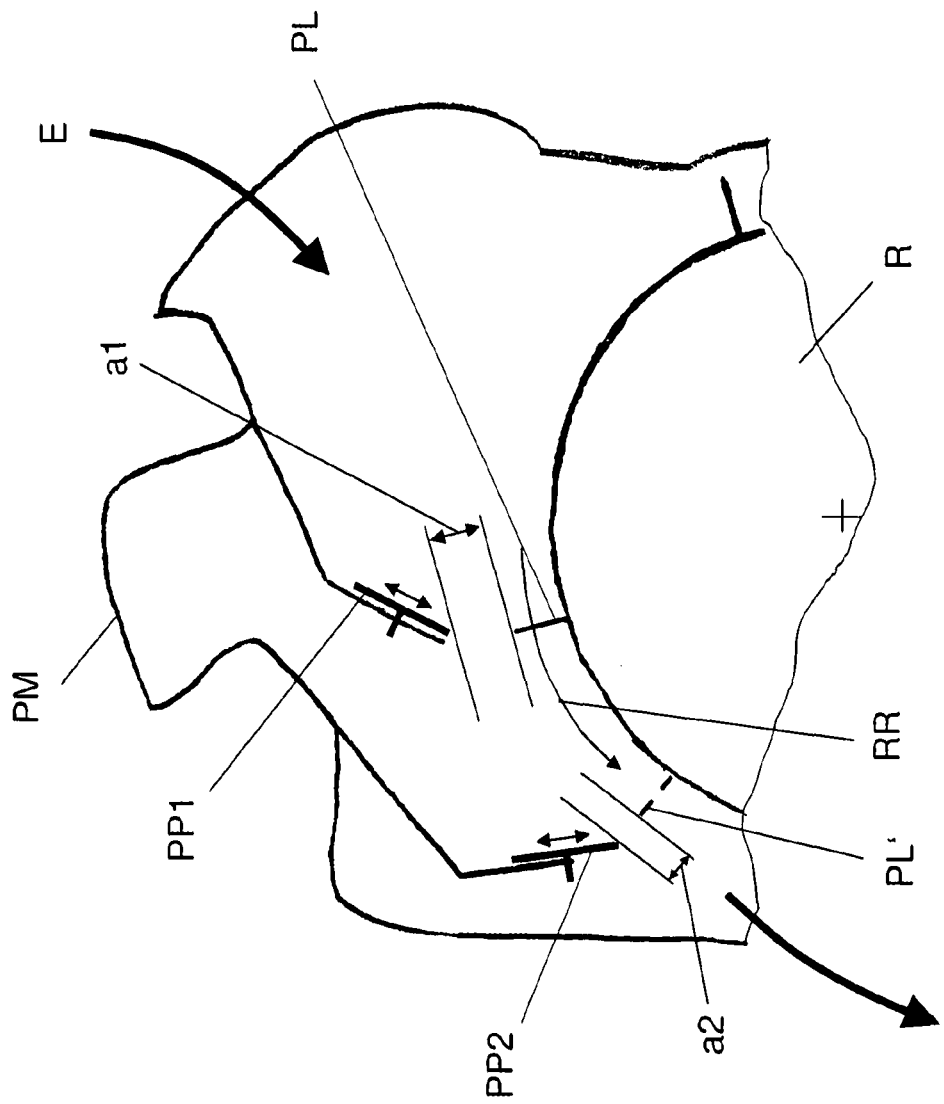
FIG. 6 is a representation of an impact mill used in the method in terms of the underlying principles, in which only a section is shown.

FIG. 6 shows advantageous details of impact mill PM. Impact mill PM has a charge E and a discharge A for the material to be processed. Furthermore, a rotor R is provided, which is conventional and which has multiple impact bars PL. In the exemplary embodiment, rotor R rotates counterclockwise and moves impact bars PL in the direction of impact plates PP1 and PP2, which are held on the housing of impact mill PM in a shiftable manner. Impact plates PP1 and PP2 are positioned such that a first radial distance a1 of an impact bar PL from first impact plate PP1 results and, following a rotation of an impact bar PL in the direction of rotation RR of rotor R (position PL'), a second radial distance a2 from second impact plate PP2 results. Distance a1 is greater than distance a2. This decrease of the distance results in a combination of primary loosening and secondary shearing of the processing material, and very good results may thus be achieved with respect to loosening and primary separation of wires from the processing material.

In conclusion, it should be noted that textile fraction TF (tire raw lint) and in particular the processed, refined textile fraction TFv (tire lint) are excellently suited for use as treatment or dewatering for sludge, in particular sewage sludge. For in the processed, refined textile fraction TFv, interfering substances, which could interfere with the treatment of sewage sludge, are as much as possible eliminated. Wires should be mentioned as physical interfering substances, which could clog the protective screens of the pumps for conveying the sewage sludge or could damage installation components of the sewage sludge processing. But potential chemical interfering substances such as zinc and sulfur may also be reduced by the processing described herein.

LIST OF REFERENCE CHARACTERS a1 distance of the first impact plate from the impact bars
a2 distance of the second impact plate from the impact bars
A discharge from the impact mill
KA channel-like section
DT density separation device
E charge into the impact mill
FE separated ferromagnetic components (wires)
L length of the channel-like section
LS air flow in the channel-like section
LU air flow separated from the material flow
LG light material fraction
LGm metal-reduced light material fraction
M1 first magnetic separator
M2 second optional magnetic separator (magnetic grate)
MK1 direction of action of the magnetic force of the first magnetic separator
MK2 direction of action of the magnetic force of the second magnetic separator
PM impact mill
PL impact bars
PP1 shiftable first impact plate
PP2 shiftable second impact plate
R rotor of the impact mill
RR direction of rotation of the rotor
SG heavy material fraction
S2 optional two-stage method (1st and 2nd stage are in the same location)
S2' optional two-stage method (1st and 2nd stage are in different locations)
TF textile fraction (tire raw lint)
TFv processed (refined) textile fraction (tire lint)
TR transportation device
VD compacting device
V1 loosening or impact treatment
V2 density separation of light material and heavy material
V3 magnetic separation of ferromagnetic components
V31 optional further magnetic separation of ferromagnetic components
V4 separation of the processed textile fraction from the air flow
V5 optional transport-optimized compacting of the processed textile fraction
V6 optional transport of the processed textile fraction to the second method stage.
ZY cyclone

The invention claimed is:
1. A method for processing a textile fraction produced in processing of discarded tires, comprising:
loosening the textile fraction;
density separation of the loosened textile fraction by force of gravity and air flow into a heavy material fraction and a light material fraction by applying suction approximately perpendicularly to a field of gravity to suction off the light material fraction;

separation of metallic components from the light material fraction included in the air flow; and separation of a metal-reduced light material fraction from the air flow.

2. The method according to claim 1, wherein the loosening is performed by an impact treatment.

3. The method according to claim 1, wherein a suction speed of the air flow is controllable.

4. The method according to claim 1, wherein a suction speed of the air flow is set to a value of at least one of (a) between approximately 10 m/s and 30 m/s and (b) approximately 20 m/s.

5. The method according to claim 1, wherein the separation of the metallic components from the light material fraction included in the air flow is performed by magnetic separation.

6. The method according to claim 5, wherein a magnetic force acts substantially transversely to the air flow.

7. The method according to claim 5, wherein a magnetic force acts at least across a major part of a length of the air flow.

8. The method according to claim 5, wherein a magnetic force acts substantially across an entire length of the air flow.

9. The method according to claim 5, further comprising a second magnetic separation of metallic components from the light material fraction included in the air flow, a magnetic force of the second magnetic separation acting substantially in parallel to the air flow.

10. The method according to claim 9, wherein the magnetic force of the second magnetic separation acts substantially across an entire cross section of the air flow.

11. The method according to claim 1, further comprising shredding the metal-reduced light material fraction following the separation of the metal-reduced light material fraction from the air flow.

12. The method according to claim 1, further comprising repeating the loosening, the density separation, the separation of the metallic components, and the separation of the metal-reduced light material fraction.

13. An installation for processing a textile fraction produced in processing of discarded tires, comprising:

a loosening device that loosens the textile fraction;

a density separation device that separates the loosened textile fraction by force of gravity and air flow into a heavy material fraction and a light material fraction, wherein the airflow is applied approximately perpendicularly to a field of gravity to suction off the light material fraction;

a magnetic separation device that separates metallic components from the light material fraction included in the air flow; and a third separation device that separates a metal-reduced light material fraction from the air flow.

14. The installation according to claim 13, wherein the loosening device includes at least one impact mill.

15. The installation according to claim 14, wherein the impact mill includes impact bars rotatable with respect to stationary impact plates, at least one first impact plate and second impact plate being provided and a distance of the impact bars from the impact plates decreases in a direction of rotation of the impact mill.

16. The installation according to claim 13, wherein the density separation device includes at least one section oriented approximately horizontally and is connected to a vertical chute of an impact mill above a heavy material discharge.

17. The installation according to claim 16, wherein the section is tubular.

18. The installation according to claim 13, wherein the magnetic separation device includes at least one of (a) a magnet and (b) a permanent magnet.

19. The installation according to claim 18, wherein the magnet is arranged in a section of the density separation device such that a magnetic force acts substantially transversely to the air flow.

20. The installation according to claim 19, wherein the magnet extends substantially across a major part of a length of the section.

21. The installation according to claim 19, wherein the section includes at least one insertion option for the magnet.

22. The installation according to claim 19, further comprising a second magnetic separation device, arranged in the section, that separates metallic components from the light material fraction included in the air flow, a magnetic force of the second magnetic separation device acting substantially in parallel to the air flow.

23. The installation according to claim 22, wherein the second magnetic separation device includes at least one magnetic grate.

24. The installation according to claim 23, wherein the magnetic grate extends substantially across an entire cross section of the section.

25. The installation according to claim 13, further comprising a shredder device adapted to shred the metal-reduced light material fraction following the separation of the metal-reduced light material fraction from the air flow.

26. The installation according to claim 13, wherein the third separation device includes a cyclone.

27. A method, comprising:

processing a textile fraction produced in processing of discarded tires the processing comprising:

loosening the textile fraction;

density separation of the loosened textile fraction by force of gravity and air flow into a heavy material fraction and a light material fraction;

separation of metallic components from the light material fraction included in the air flow;

separation of a metal-reduced light material fraction from the air flow; and treating sludge using the processed textile fraction as an additive.

28. The method according to claim 27, wherein the processed textile fraction is used to dewater the sludge.

29. The method according to claim 27, wherein the sludge includes sewage sludge.

30. The method according to claim 1, wherein the method is performed by the installation recited in claim 13.

31. The installation according to claim 13, wherein the installation is adapted to perform the method recited in claim 1.

* * * * *